United States Patent
Danielsen

(10) Patent No.: US 11,448,186 B2
(45) Date of Patent: Sep. 20, 2022

(54) POWER MANAGEMENT SYSTEM FOR WIND TURBINE(S) BEING CONNECTED TO A POWER SUPPLY WITH A LIMITED CAPACITY

(71) Applicant: VESTAS WIND SYSTEMS A/S, Aarhus (DK)

(72) Inventor: Niels Erik Danielsen, Brabrand (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 400 days.

(21) Appl. No.: 15/543,859

(22) PCT Filed: Jan. 12, 2016

(86) PCT No.: PCT/DK2016/050008
§ 371 (c)(1),
(2) Date: Jul. 14, 2017

(87) PCT Pub. No.: WO2016/112918
PCT Pub. Date: Jul. 21, 2016

(65) Prior Publication Data
US 2018/0266391 A1 Sep. 20, 2018

(30) Foreign Application Priority Data
Jan. 15, 2015 (DK) .......................... PA 2015 70018

(51) Int. Cl.
*F03D 7/02* (2006.01)
(52) U.S. Cl.
CPC ......... *F03D 7/0284* (2013.01); *F03D 7/0204* (2013.01); *F03D 7/0264* (2013.01);
(Continued)

(58) Field of Classification Search
CPC .... F03D 7/0284; F03D 7/0204; F03D 7/0264; F05B 2270/107; F05B 2270/1074; F05B 2270/337; Y02E 10/723
See application file for complete search history.

(56) References Cited

U.S. PATENT DOCUMENTS

| 8,000,840 B2 * | 8/2011 | Nielsen | F03D 7/026 700/286 |
| 2013/0175801 A1 * | 7/2013 | Matzen | F03D 7/0284 290/44 |

FOREIGN PATENT DOCUMENTS

| CN | 201022153 Y | 2/2008 |
| CN | 102810905 A | 12/2012 |

(Continued)

OTHER PUBLICATIONS

International Search Report for PCT/DK2016/050008, dated Apr. 12, 2016.

(Continued)

*Primary Examiner* — Tulsidas C Patel
*Assistant Examiner* — Joseph Ortega
(74) *Attorney, Agent, or Firm* — Patterson + Sheridan, LLP

(57) ABSTRACT

The invention relates to a power management system for one or more wind turbines where the one or more wind turbines are connected to a power supply with a limited capacity for providing power to a number of power consuming units, such as to an emergency power supply arranged for providing power in a grid loss situation. The power management system comprises a dispatcher connected to the power supply to access an available capacity of the power supply, and a requester connected to at least one power consuming unit, the requester being arranged to control the power (Continued)

consumption of the power consuming unit by either allows or deny the power consuming unit to consume power.

20 Claims, 3 Drawing Sheets

(52) U.S. Cl.
CPC . *F05B 2270/107* (2013.01); *F05B 2270/1074* (2013.01); *F05B 2270/337* (2013.01); *Y02E 10/72* (2013.01)

(56) References Cited

FOREIGN PATENT DOCUMENTS

| CN | 202914251 U | 5/2013 |
| CN | 103890385 A | 6/2014 |
| EP | 1961957 A2 | 8/2008 |
| EP | 2738382 A2 | 6/2014 |
| WO | 20100031575 A2 | 3/2010 |

OTHER PUBLICATIONS

Danish Search Report for PA 2015 70018, dated Aug. 5, 2015.
Chinese Office Action for Application No. 201680010375.3 dated Sep. 4, 2018.

* cited by examiner

POWER MANAGEMENT SYSTEM FOR WIND TURBINE(S) BEING CONNECTED TO A POWER SUPPLY WITH A LIMITED CAPACITY

FIELD OF THE INVENTION

The present invention relates to a power management system for one or more wind turbines, in particular it relates to a power management system where the one or more wind turbines are connected to a power supply with a limited capacity, such as to an emergency power supply arranged for providing power in a grid loss situation.

BACKGROUND OF THE INVENTION

A wind power plant typically includes several wind turbines, the generating outputs of which are networked to supply power to the national or regional grid electrical system (or simply the grid). A wind turbine includes complicated electrical systems including numerous control units, switching equipment, cooling systems, lighting systems, actuators and hydraulic systems which require their own dedicated power supply. This power supply is itself fed from the grid electrical system via a transformer sub-station that forms part of the wind turbine facility. Such a power supply may be termed an 'internal power supply grid', and its role is to manage and distribute a medium voltage power supply to the wind turbines and ancillary equipment in the form of power consuming units within the wind power plant to ensure high availability of power generation.

In the event of a so-called grid loss where the wind power plant loses connectivity to the grid, the electrical systems of the wind turbines also loses its power. In order to mitigate problems arising from such power loss, it is known to equip the wind power plant with a form of auxiliary power supply. This may take the form of a battery based system or alternatively may be based around a diesel generator. For example, US2013/0175801 describes a system in which a diesel generator is used as a backup power supply in an offshore wind farm.

A backup supply system may ensure that the turbines of the wind power plant remain operational even during a grid power disruption, however they tend to be expensive to install and maintain since their objective is to maintain the wind farm in an operational condition even without the grid power input. As a consequence, such 'continuous' backup power systems may not be an appropriate solution in all environments. It is against this background that the invention has been devised.

SUMMARY OF THE INVENTION

It would be advantageous to achieve power management system for one or more wind turbines which in a situation of need can provide power to the one or more wind turbines based on a power supply with a limited capacity.

Accordingly, in a first aspect, there is provided a power management system for one or more wind turbines, the one or more wind turbines being connected to a power supply with a limited capacity, and the one or more wind turbines each comprising a number of power consuming units; wherein the power management system comprises:
a dispatcher connected to the power supply to access an available capacity of the power supply;
a requester connected to at least one power consuming unit, the requester being arranged to control the power consumption of the power consuming unit;
wherein the requester upon a need of a power consuming unit for consuming power forwards a request to the dispatcher for an amount of power, and wherein the dispatcher based on the available capacity of the power supply either allows the power consuming unit to consume the amount of power or denies the power consuming unit to consume the amount of power; and
wherein the dispatcher sends information to a requester about a base load, and wherein a unit is allowed to consume an amount of power up to the base load without forwarding a request for an amount of power.

By use of a dispatcher which can control the power consumption from the power supply based on the capacity of the power supply, it can be assured that only important power consuming units are allowed to consume power, whereas less important power consuming units are denied or requested to wait with consuming power. In this manner a reduced power supply can be used, as compared to a situation where the power supply needs to power all, or most, functions of a turbine at the same time.

One important power consuming unit may be the yaw motor, which may be allowed to yaw the rotors up against the wind to limit edgewise vibrations which risk building up on the blades. However, it may also be important to ensure hydraulic pressure on certain systems, that cooling fans are operating in a high temperature environment, that heating elements are operating in a low temperature environment, and motors to control the azimuthal position of the rotor blades. Moreover, other power consuming units may also be important to handle during certain conditions.

In an important embodiment the power management system is central to a single turbine to manage power requests from power consuming units within the single turbine in order to manage a single turbine emergency power supply.

In another important embodiment, the power management system is central to parts of a, or even to an entire, wind power plant to manage power requests from power consuming units within the number of turbines connected to the wind power plant emergency power supply.

The power management system, or at least parts of it, may be implemented in software on dedicated or general purpose computing means.

In a second aspect, the invention relates to a method of power management of one or more wind turbines, the one or more wind turbines being connected to a power supply with a limited capacity, and the one or more wind turbines each comprising a number of power consuming units; the method comprises:
receive an instruction to operate a power consuming unit;
determine an amount of power for operating the power consuming unit;
determine a base load up to which the unit is allowed to consume power;
if the amount of power is less than the base load allow the power consuming unit to consume the amount of power; and
if the amount of power is more than the base load:
request an amount of power for operating the power consuming unit;
access an available capacity of the power supply;
determine whether the amount of power can be used based on the available capacity of the power supply, and generate a request result; and either allow the power consuming unit to consume the amount of power or deny the power consuming unit to consume the amount of power in accordance with the request result.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
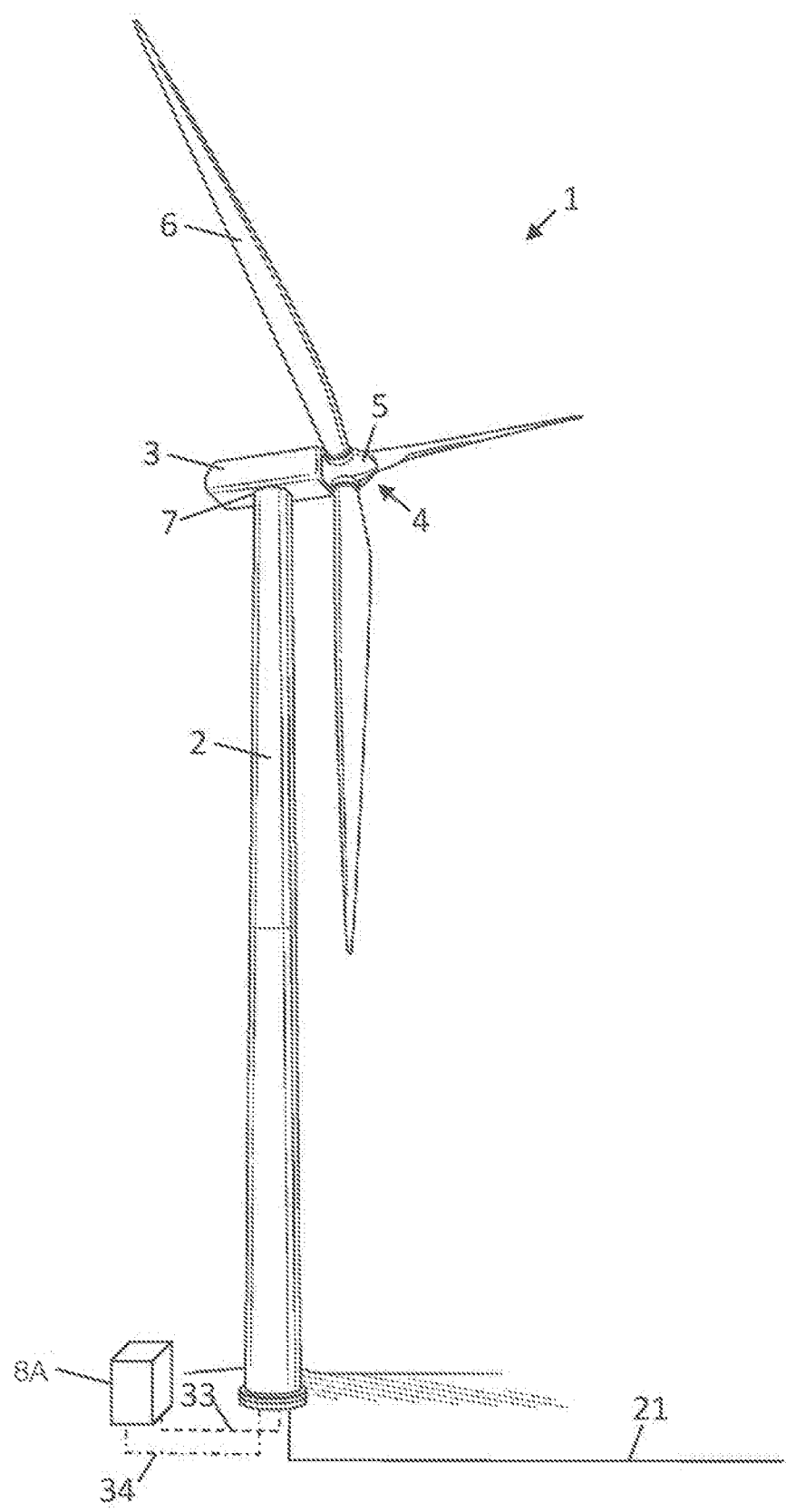
FIG. 1 illustrates, in a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower 2, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. A yaw drive 7 is positioned between the tower 2 and the nacelle 3, in order to rotated the nacelle and thereby the rotor with respect to the wind direction.

Figure 2:
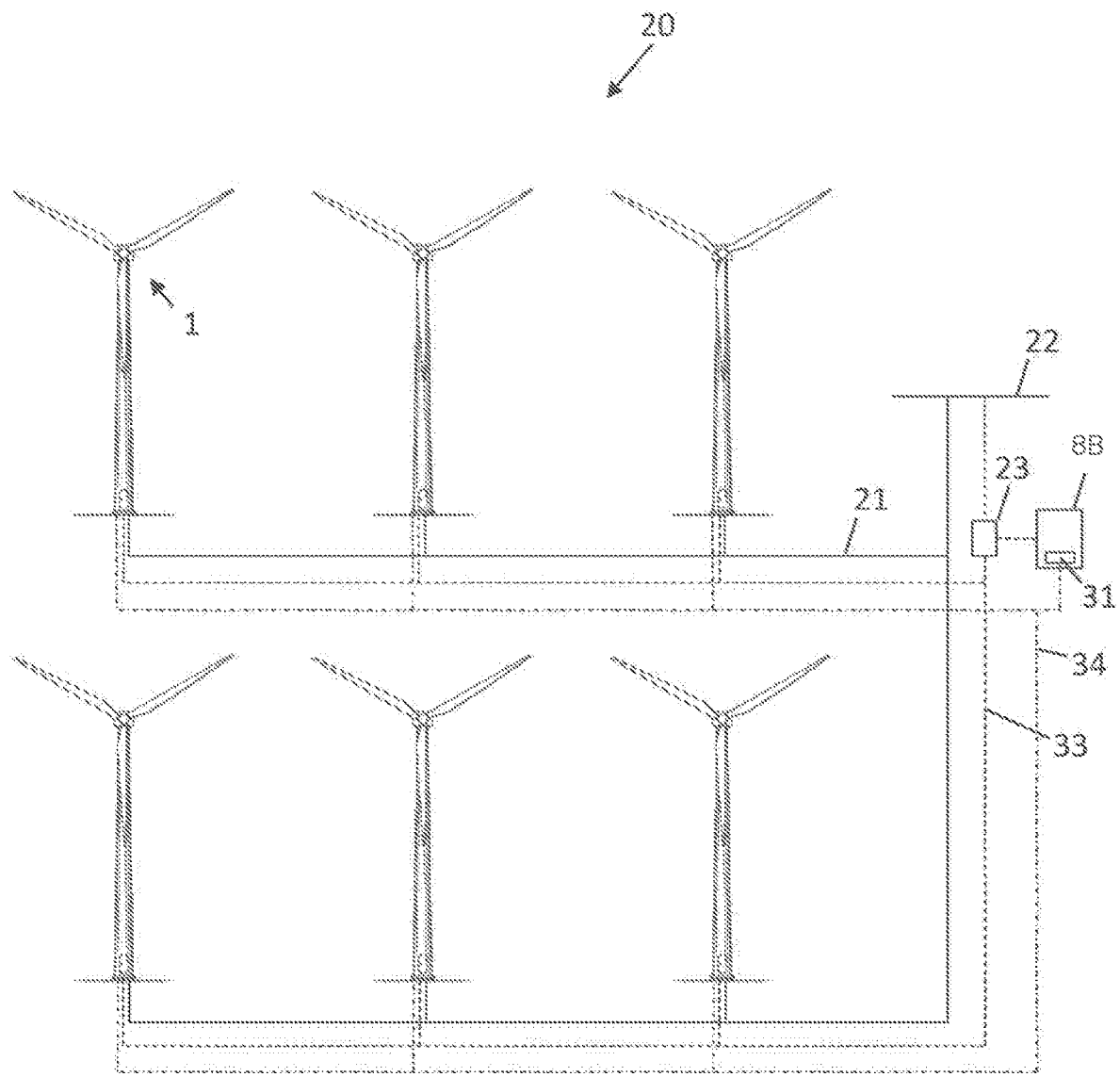
FIG. 2 illustrates a collection of wind turbines belonging to a wind power plant.

FIG. 2 illustrates a collection of wind turbines 1 belonging to a wind power plant 20, also referred to as a wind farm or wind park, that serves as a power generating plant connected by transmission lines 21 with a power grid 22. The power grid generally consists of a network of power stations, transmission circuits, and substations coupled by a network of transmission lines that transmits the power to loads in the form of end users and other customers of electrical utilities. The figure illustrates six wind turbines, a wind power plant may comprise less or more wind turbines.

Figure 3:
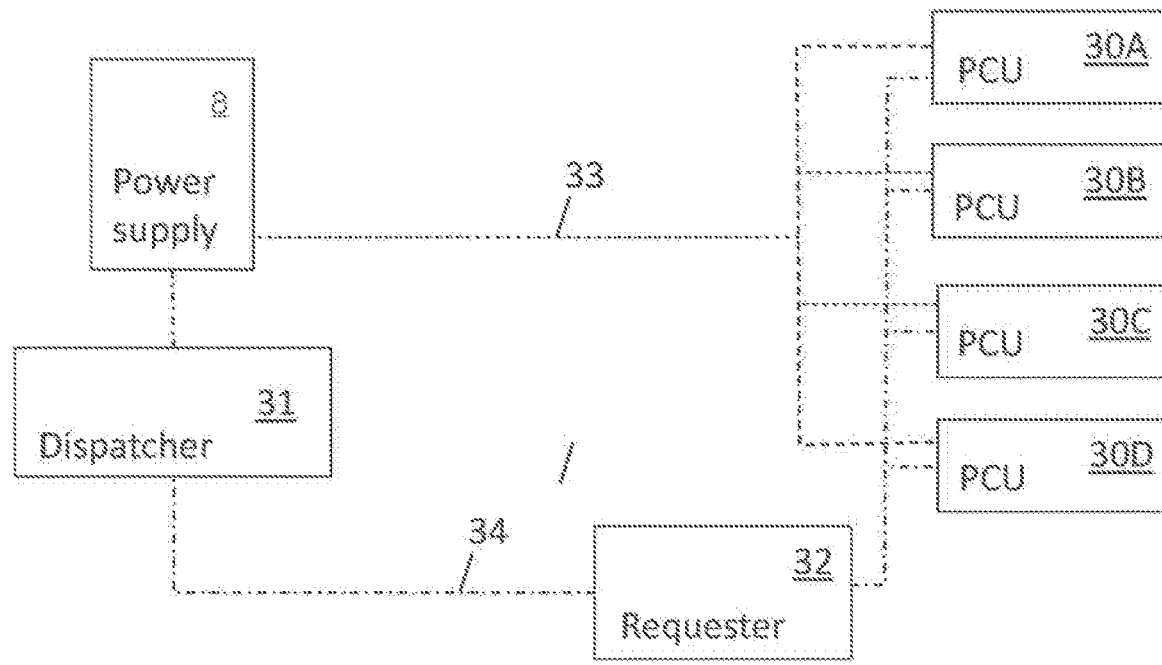
FIG. 3 illustrates a schematic representation of a power management system.

FIG. 3 illustrates a schematic representation of a power management system according to embodiments of the present invention.

FIG. 3 illustrates a power supply 8 with a limited capacity and a number of power consuming units (PCU) 30A-30D. Here four power consuming units are shown, but any number of power consuming units can be envisioned. Examples of power consuming units include, but are not limited to, yaw motors for yawing the turbine, pumps and power supplies for operating the hydraulic system, power supplies for operating the cooling system, power supplies for operating the heating system, power supplies to operate to turn the rotor to adjust the azimuthal position of the blades, pumps for lubricating moving parts that are in need of lubrication, and other elements used in a wind turbine which require and consume power in order to operate. The various power supplies may be in the form of voltage transformers.

The power management system comprises a dispatcher 31 connected via a communication line 34 to the power supply 8 in order to access the available capacity of the power supply. The dispatcher may also be referred to as a power manager. The power management system further comprises a requester 32 connected to the power consuming units 30A to 30D. The requester is arranged to control the power consumption of the power consuming units. This may be done in any appropriate way, e.g. by providing an input to the power consuming unit which enables or disables the unit.

When a need for power arises, e.g. in connection with a grid loss situation or other decoupling of the turbines from the grid, it is the role of the power management system to make sure that important or certain power consuming units is supplied with a sufficient amount of power. In an embodiment, this is done by arranging the requester to forward a request to the dispatcher for an amount of power. Based on the available capacity of the power supply, the dispatcher either allows the power consuming unit to consume the amount of power or denies the power consuming unit to consume the amount of power. If a power consuming unit is allowed to consume power it draws power from the power supply 8 via an electrical connection 33 between the power consuming units and the power supply.

The requester 32 is illustrated as a separate unit connected to the power consuming units 30A-30D, however other embodiments are also possible. For example, each power consuming unit may be provided with a dedicated requester. In another example, groups of power consuming units, such as units directed to rotor control or units directed to yaw control, may be connected to a group requester.

The requester may in embodiments comprise instructions as to which power consuming units that are in need of power in a grid loss situation. However, the requester may also be connected to, or implemented by, a control system which is ensured power at all time. While the requester may be implemented in hardware, it is typically a computing unit which is instructed by computer instructions to perform its tasks. The requester may also be implemented as a software component, or electronic component, which is electrically connected to the power consuming units.

The dispatcher may in embodiments also comprise instructions as to which power consuming units that are in need of power in a grid loss situation, as well as the role of the various power consuming units in a grid loss situation. However, the dispatcher may also be connected to, or implemented by, a control system which is ensured power at all time. While the dispatcher may be implemented in hardware, it is typically a computing unit which is instructed by computer instructions to perform its tasks. The dispatcher may also be implemented as a software component, or electronic component, which is electrically coupled to the power consuming units.

The requester and/or the dispatcher may also be implemented as part of the wind turbine control system, such as a in a safety-certified control system, or connected to the wind turbine control system.

In an embodiment, the dispatcher does not actively monitor the available capacity of the power supply, instead it may access the available capacity of the power supply, e.g. upon a grid loss or from a registry, to determine the start capacity, and then based on the requests that are allowed determine the available capacity during the power loss. In another embodiment, the dispatcher actively monitors the actual power capacity of the power supply so that the allowed requests are based on measured values of the available capacity.

In a grid loss situation, the internal power supply grid 33 cannot be fed from the utility grid. In an embodiment, a switch element (23, FIG. 2) may connect the internal power supply grid 33 to the power supply with the limited capacity 8, 8A, 8B and thereby provide access to power for the power consuming units.

In such a situation, the requesters of the various power consuming units, upon a need of power forwards a request to the dispatcher for an amount of power. The role of the dispatcher is to either allow the power consuming units to consume the amount of power or deny the power consuming unit to consume the amount of power, in accordance with the available capacity of the power supply.

FIG. 1 further illustrates an embodiment of the power supply with the limited capacity 8A connected to the wind turbine via communication line 33 and power line 34. In this embodiment, the power supply 8A is a single turbine emergency power supply dedicated to support a single turbine during grid loss. That is the dispatcher and the requester are local to the specific turbine.

FIG. 2 further illustrates an embodiment of the power supply with the limited capacity 8B connected to the wind turbines via communication line 33 and power line 34. Moreover, the dispatcher 31 is illustrated together with the power supply 8B. In this embodiment, the power supply 8B is a wind power plant emergency power supply dedicated to support all, or at least some of the wind turbines in the wind power plant. In such situations, the dispatcher and the requester may both be local to the power supply 8B. The requester may be local to the turbines, whereas the dispatcher is local to the power supply 8B. Moreover, one of, or both the requester and the dispatcher may be implemented together with, or part of, a power plant controller.

The power supply 8, 8A, 8B may in embodiments be a diesel generator and/or a battery supply. The battery supply may be based on rechargeable batteries. In an embodiment, the rechargeable batteries may be charged during grid connection and used for power supply during grid loss. The capacity of the power supply 8, 8A, 8B is scaled according to the number of turbines it needs to support, as well as to the number and nature of power consuming units it needs to support.

The power supply may be used for any purpose, but in a typical situation it is an emergency power supply arranged for supplying power in the event of the one or more turbines are disconnected from the grid.

The dispatcher may send information to a requester about a base load, so that a unit is allowed to consume an amount of power up to the base load without forwarding a request for an amount of power. This may be used in a situation where the power supply is scaled to supply the idle consumption of any units, e.g. voltage transformers, that are operating during grid loss. Should the power consuming unit need further power than what is covered by the base load, it sends a request for more power to the dispatcher. In an embodiment, the power management system may be disabled by setting the base load to infinity.

A request may as a minimum comprise an element, i.e. a data element, containing the power demand. However, also a priority may be included. The priority may be scaled in a manner so that the highest priority are given to power consuming units which risk to damage the turbine or parts of the turbine if not granted. In embodiment, the dispatcher grants requests with highest priority, whereas a lower priority request is granted according to a set of dispatch rules. However, all priorities may be handled in accordance with dispatch rules.

The request may also comprise a time period to indicate the duration of the power consumption. Thus a request may in an embodiment be such as: Request=(50 kW, high, 45 sec).

In response to receiving the request, the dispatcher may reply with a response. The response may in an embodiment comprise a permission to consume a specified amount of power. However, the permission may be conditioned upon a number of limitations. Such limitations may be an upper limit of the power consumption and a time period during which it needs to draw the power. By imposing an upper limit, the turbine may still be able to perform the desired action, but possibly slower. The duration may e.g. be imposed to ensure that the power drawn from the various units are spread in time, to reduce the peak consumption. The response may in an embodiment be such as: Rep= (allowed, 40 kW, between $t_1$ and $t_2$).

In an embodiment, the system trusts that the power consuming units only draw power when allowed so, and does not draw power when not allowed to. This may be improved by implementing the requester in a manner so that the requester is arranged to connect the power consuming unit to the power supply and draw the allow amount of power from the power supply when allowed by the dispatcher, and arranged to disconnect the power consuming unit from the power supply when denied by the dispatcher to consume power. As an example a switch may be used which opens or closes, and thereby provide electrical connection only in periods when allowed.

In an embodiment, the dispatcher allows the power consuming unit to consume the amount of power or denies the power consuming unit to consume the amount of power based on at least one further input directed to an operational state or physical state of one or more of the wind turbines or a power consuming unit. In an embodiment, the input directed to the operational state or the physical state may be provided as part of the request or it may be provided as a separate input to the dispatcher, e.g. provided from the turbine controller and/or sensors in the turbine. By taking into account an operational state or physical state, it can be ensured that the power consuming units which are allowed to consume power are dynamically selected to ensure that under the given condition or state, that the most important units are allowed to consume power.

In an embodiment, an operational state may be whether or not a power consuming unit is in a standby state or shutdown state. The power needed to start the power consuming unit from shutdown may be impermissible, whereas the power need to wake the unit from standby may be permissible. For example a pump may use 5 kW in standby, which may have been allowed by an earlier request and 50 kW during normal operation at no additional cost, however, to start-up the pump from shutdown may require 150 kW. In such situations, use of the pump may be allowed if it is in standby, but may not be allowed if start up from shutdown is needed.

Another operational state may e.g. be the temperature of a given component. This may e.g. be used to decide whether or not a cooling system can be operated, so that cooling is only activated for critical temperatures, whereas components with non-critical temperatures are not cooled, even though they would have been cooled if the power capacity had been unlimited.

In an embodiment, a physical state may e.g. be the position of the yaw. It may be critical that certain turbines are allowed to yaw, whereas others are not, e.g. dependent on the wind direction. Edgewise vibrations may risk building up and damage the blades if the turbine is not allowed to yaw upwind. The risk may be higher for certain yaw positions than for other. The physical state may also be directed to a blade vibration sensor, so that a turbine is only allowed to yaw (i.e. consume power), if the blade vibration is above a given threshold.

Another example of the physical state is the azimuthal position of the rotor, so that rotors where a blade is in risk of hitting the tower are allowed to be turned, whereas rotors which are stopped in a position where tower strike is not a risk are not allowed to turn.

Figure 4:
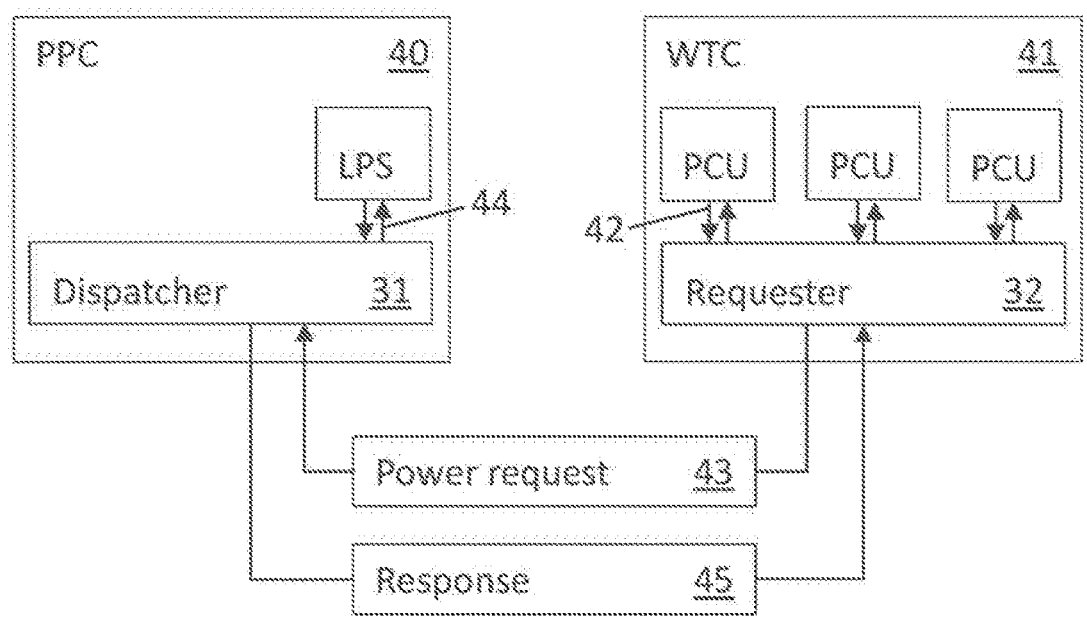
FIG. 4 illustrates an embodiment of a power management system and a method of operating the system.

FIG. 4 illustrates an embodiment of a power management system and a method of operating the system. In the illustrated embodiment, the dispatcher 31 is implemented into the power plant controller PPC 40, which can access the available capacity of the limited power supply, LPS. The requester 32 is implemented into the winds turbine controller WTC, 41. Also the control of a number of power consuming units PCUs connected to the requester is illustrated.

In an embodiment, the wind turbine needs to operate one of the power consuming units by power delivered from the power supply with limited capacity. An instruction to operate the power consuming unit is generated, for example by the control system of the power consuming unit itself or by the wind turbine controller WTC, this instruction 42 is received by the requester.

Upon receipt of the instruction to operate a power consuming unit, a request 43 for an amount of power for operating the power consuming unit is forwarded from the requester to the dispatcher. The dispatcher 31 access 44 an available capacity of the power supply, and determine whether the amount of power can be used based on the available capacity of the power supply, and generate a request result response 45, e.g. in the form of a permission, which either allow the power consuming unit to consume the amount of power or deny the power consuming unit to consume the amount of power in accordance with the request result. Based on the result, the power consuming unit will either be operated or not.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A power management system for one or more wind turbines connected to a power supply with a limited capacity, the one or more wind turbines comprising one or more power consuming units, wherein the power management system comprises:
   a dispatcher connected to the power supply and configured to:
      access an available capacity of the power supply;
      determine a base load for the power supply that is applied to requests for power consumption from the one or more power consuming units, wherein the base load is less than the available capacity; and
      based on the available capacity, determine whether to allow or deny the requests for power consumption to be fulfilled by the power supply; and
   a requester connected to the one or more power consuming units, the requester configured to:
      receive a first request for power consumption from a first power consuming unit of the one or more power consuming units;
      receive information from the dispatcher about the base load;
      compare the first request with the base load;
      allow, without forwarding the first request to the dispatcher, the first request to be fulfilled by the power supply when the first request does not exceed the base load; and
      forward the first request to the dispatcher when the first request exceeds the base load.

2. The power management system according to claim 1, wherein the first request comprises a power demand and a priority,
   wherein the dispatcher determines whether to allow or deny the first request based in part on the priority.

3. The power management system according to claim 1, wherein the request comprises a time period indicating a duration of the power consumption.

4. The power management system according to claim 1, wherein the dispatcher is further configured to:
   upon receipt of the first request from the requester, transmit a response to the requester including a permission for the first power consuming unit to consume a specified amount of power.

5. The power management system according to claim 1, wherein determining whether to allow or deny requests for power consumption is further based on at least one further input directed to one of: (A) an operational state and (B) a physical state of one of (i) at least one of the one or more wind turbines and (ii) at least one of the one or more power consuming units.

6. The power management system of claim 5, wherein the at least one further input comprises one of:
   a first input directed to a first operational state indicating whether the at least one of the one or more power consuming units is in one of a standby state and a shutdown state;
   a second input directed to a second operational state indicating a temperature of a component of the one or more wind turbines;
   a third input directed to a first physical state indicating a yaw position; and
   a fourth input directed to a second physical state indicating an azimuthal position of a rotor of the at least one of the one or more wind turbines.

7. The power management system according to claim 1, wherein the power supply is an emergency power supply arranged for supplying power in the event of at least one of the one or more wind turbines being disconnected from a utility grid.

8. The power management system according to claim 1, wherein the requester is further configured to:
   when the first request is allowed by the dispatcher, connect the first power consuming unit to the power supply to permit the first power consuming unit to draw an allowed amount of power from the power supply; and
   when the first request is denied by the dispatcher, disconnect the first power consuming unit from the power supply.

9. The power management system according to claim 1, wherein the power supply is a single turbine emergency power supply for a first wind turbine of the one or more wind turbines.

10. The power management system according to claim 1, wherein the one or more wind turbines comprise a plurality of wind turbines arranged as a wind power plant, and wherein the power supply is an emergency power supply for the wind power plant.

11. The power management system according to claim 1, wherein the power supply comprises a diesel generator.

12. The power management system according to claim 1, wherein the power supply comprises a battery supply.

13. The power management system according to claim 12, wherein the battery supply includes one or more rechargeable batteries configured to be charged when connected to a utility grid.

14. The power management system of claim 1, wherein accessing the available capacity of the power supply comprises:
   determining a start capacity of the power supply; and
   based on one or more previously allowed requests for power consumption, determining the available capacity of the power supply.

15. The power management system of claim 1, wherein the dispatcher is further configured to disable the power management system by setting a value of the base load to infinity.

16. A method of power management of one or more wind turbines connected to a power supply with a limited capacity, the one or more wind turbines comprising one or more power consuming units, the method comprising:
   receiving an instruction to operate a first power consuming unit of the one or more power consuming units;
   determining an amount of power for operating the first power consuming unit;
   determining, using information received from a dispatcher connected to the power supply, a base load for the power supply up to which the first power consuming unit is allowed to consume power from the power supply without forwarding a request to the dispatcher, wherein the base load is less than an available capacity of the power supply;
   comparing the amount of power with the base load; and
   responsive to determining the amount of power does not exceed the base load, allowing the first power consuming unit to consume the amount of power.

17. The method of claim 16, further comprising:
   receiving an instruction to operate a second power consuming unit of the one or more power consuming units;
   determining a second amount of power for operating the second power consuming unit;
   responsive to determining the second amount of power exceeds the base load, forwarding a second request from a requester to the dispatcher, the requester connected to the one or more power consuming units; and
   determining, by the dispatcher, whether to allow or deny the second request.

18. The method of claim 17, wherein determining whether to allow or deny the second request comprises:
   accessing, by the dispatcher, an available capacity of the power supply;
   determining, based on the available capacity, whether the second amount of power can be met; and
   transmitting a request result to the requester.

19. The method of claim 16, further comprising:
   generating the instruction by one of: (i) a control system of the first power consuming unit, and (ii) a wind turbine controller of a first wind turbine of the one or more wind turbines that is associated with the first power consuming unit.

20. A wind turbine system comprising:
   one or more wind turbines connected to a power supply with a limited capacity, wherein the one or more wind turbines comprise one or more power consuming units; and
   a power management system comprising:
      a dispatcher connected to the power supply and configured to:
         access an available capacity of the power supply;
         determine a base load for the power supply that is applied to requests for power consumption from the one or more power consuming units, wherein the base load is less than the available capacity; and
         based on the available capacity, determine whether to allow or deny the requests for power consumption to be fulfilled by the power supply; and
      a requester connected to the one or more power consuming units, the requester configured to:
         receive a first request for power consumption from a first power consuming unit of the one or more power consuming units;
         receive information from the dispatcher about the base load;
         compare the first request with the base load;
         allow, without forwarding the first request to the dispatcher, the first request to be fulfilled by the power supply when the first request does not exceed the base load; and
         forward the first request to the dispatcher when the first request exceeds the base load.

* * * * *